(12) United States Patent
Loui et al.

(10) Patent No.: US 6,813,618 B1
(45) Date of Patent: Nov. 2, 2004

(54) SYSTEM AND METHOD FOR ACQUISITION OF RELATED GRAPHICAL MATERIAL IN A DIGITAL GRAPHICS ALBUM

(76) Inventors: Alexander C. Loui, 343 State St., Rochester, NY (US) 14650; Charles N. Judice, 343 State St., Rochester, NY (US) 14650; David R. Cok, 343 State St., Rochester, NY (US) 14650

( * ) Notice: Subject to any disclaimer, the term of this patent is extended or adjusted under 35 U.S.C. 154(b) by 590 days.

(21) Appl. No.: 09/642,534

(22) Filed: Aug. 18, 2000

(51) Int. Cl.[7] .............................................. G06F 17/30
(52) U.S. Cl. ................... 707/5; 707/10; 707/3; 707/102; 704/9; 709/203; 709/219; 345/810
(58) Field of Search ..................... 707/10, 102, 104.1, 707/2–5; 704/9; 709/203, 219; 345/810

(56) References Cited

U.S. PATENT DOCUMENTS

| | | | |
|---|---|---|---|
| 5,493,677 A | | 2/1996 | Balogh et al. |
| 5,590,039 A | | 12/1996 | Ikeda et al. |
| 5,751,286 A | | 5/1998 | Barber et al. |
| 5,809,497 A | * | 9/1998 | Freund et al. ................ 707/2 |
| 5,963,940 A | | 10/1999 | Liddy et al. |
| 6,052,656 A | | 4/2000 | Suda et al. |
| 6,307,550 B1 | * | 10/2001 | Chen et al. ................ 345/418 |
| 6,324,545 B1 | * | 11/2001 | Morag ....................... 707/202 |
| 6,332,146 B1 | * | 12/2001 | Jebens et al. ............ 707/104.1 |
| 6,434,579 B1 | * | 8/2002 | Shaffer et al. .............. 715/520 |
| 6,499,016 B1 | * | 12/2002 | Anderson .................... 704/275 |
| 6,546,399 B1 | * | 4/2003 | Reed et al. .............. 707/104.1 |
| 6,629,100 B2 | * | 9/2003 | Morris et al. ................. 707/10 |
| 6,629,104 B1 | * | 9/2003 | Parulski et al. ............. 707/102 |
| 2001/0004739 A1 | * | 6/2001 | Sekiguchi et al. .......... 707/100 |
| 2001/0039493 A1 | * | 11/2001 | Pustejovsky et al. ....... 704/235 |
| 2002/0184196 A1 | * | 12/2002 | Lehmeier et al. ............. 707/3 |
| 2003/0033296 A1 | * | 2/2003 | Rothmuller et al. ........... 707/3 |

* cited by examiner

*Primary Examiner*—Jean R. Homere
*Assistant Examiner*—Leslie Wong
(74) *Attorney, Agent, or Firm*—David M. Woods

(57) ABSTRACT

Reference material in a digital graphics album is specified. Annotation data is extracted from the reference material and may be processed by a natural language processor to produce search keywords. In addition to the keywords, user directives may be provided, both of which are used to conduct a search for related graphical materials. The search is conducted by querying a graphical material database through a network connection. The search results are received and the user can select from the resultant materials for inclusion in the digital graphics album. If no satisfactory material is found, the user can specify a reference graphical image that is processed to produce search criteria that are image content descriptors. The database is again queried in accordance with these descriptors to provide search results for possible inclusion.

61 Claims, 7 Drawing Sheets

SYSTEM AND METHOD FOR ACQUISITION OF RELATED GRAPHICAL MATERIAL IN A DIGITAL GRAPHICS ALBUM

FIELD OF THE INVENTION

The invention relates generally to the field of digital graphics albums, and, more particularly, to the searching, acquisition, and insertion of related digital images and video clips into a digital graphics album.

BACKGROUND OF THE INVENTION

With the advent of digital imaging in the marketplace, and the broad acceptance of digital cameras, as well as broad utilization of digital images in Internet applications, the volume of commercial and consumer held digital image files has increased dramatically in recent years. Much like the problem of a closet full of shoe boxes of randomly filed photographic prints, in the digital image and graphics environment, there are computer "shoe boxes" full of randomly stored digital graphic images. This leads to problems in locating and categorizing digital graphics files.

A traditional photo album is a place to store photographic prints. Pictures were placed in the album and often times notes and annotations were added to identify pertinent information about the pictures. In recent times, the electronic photo album has been developed to store digital graphic image files much in the same way as the traditional photo album. Eastman Kodak Company has developed digital graphic album applications, such as the Kodak Picture Page software, which allow a user to organize digital graphics images into album pages. Typically, users organize images by dates and times, places, subject and so forth. Such software allows the user to annotate the images by entering text, or other data, describing the image.

Traditionally, picture albums contained photographs taken by a user, and perhaps photographs given to them by others. In the digital environment, however, the sources of digital graphic materials is much more diverse. Of course, digital graphic materials may come from a user's digital camera. They may also come from scanned photographic prints that are converted to digital format. They may also be created electronically, such as with graphic software or photo editing software. In addition, there are private and commercial sources of graphical images. These include stock photo agencies, and shared photo resources that provide the sharing of images over networks, such as the Internet. User can now access digital graphical images on the Internet and download them into their personal computer. These images can be placed in a digital graphic album and be made an integral part of the album.

As a user builds a digital graphic album, there are many choices as to how the images will be organized and annotated. Naturally, digital graphic album software applications allow the user to do this manually. But because of the power of computers and software, software suppliers have added features which make organization of images in digital graphic albums more automated, easier and more flexible. In addition, the kinds of things that can be stored in a digital graphics album has increased. For example, video clips can be placed in the album as well as still images, computer generated graphics, and other digital materials. In the case of a video image, typically a key frame is selected for static display, identifying the video. When a user desires to watch the video, the key frame is selected and this causes the software application to play the video clip.

Modern camera systems have evolved and some now provide a means of generating annotation data for digital graphic images. Cameras may have a built in clock which time stamps the images. Some allow entry of textual data that can be associated with the digital images. Some even include a global position systems (GPS) receiver which can mark images with the geographic location of the camera at the time the image is exposed. Some allow for voice annotation. All of these kinds of information can be fed to the digital graphics albuming application to be used to annotate the digital graphics materials.

When the digital graphics materials are added to the digital graphics albuming applications, users can manually add annotation data to the graphics materials. These, combined with the aforementioned automatic annotation materials allow the final, arranged, album to be more rich and full in its context and presentation, which prompts a viewer's memory and greatly expands the enjoyment of viewing such an album. Of course, the arrangement of such a wealth of information can be cumbersome and time consuming. Digital graphics albuming application suppliers have responded by providing features which automatically arrange digital graphics materials within such albums. Kodak Picture Page software is an example of this. The arrangement decisions can be based on the classical indicia, such as time, place, event, and so forth. Much of this information is derived from the annotation materials associated with particular graphical materials. After the graphical material is preliminarily arranged by the software application, the user can make modifications to suit personal tastes.

An aspect of the subsequent arrangements that a user may make to a photo album is that the user may desire to add additional images to complete the album. As was discussed earlier, the sources are many and varied. This presents a problem to the user because the user may know what kind of images are desired, but not know where to obtain such images. For example, suppose a user has returned from a vacation in France and has a collection of images and videos from the vacation. These are placed in the digital graphics album, annotated and arranged. Upon review, the user realizes that there are several images of the user in the vicinity of the Eiffel Tower, but no images of the Tower itself. Or perhaps the user knows that during the vacation, a major news story broke about France, and the users desires a video clip for the album. Through some amount of search, the user may find such digital graphics materials, but such searching is cumbersome and time consuming.

Consequently, a need exists in the art for an automatic way of identifying, searching and selecting digital graphical materials for use in supplementing digital graphics albums.

SUMMARY OF THE INVENTION

The need in the art is addressed by the apparatus and methods of the present invention. In an illustrative embodiment of the present invention, a method of adding graphical material to a digital graphics album is disclosed. The method includes specifying reference material in a digital graphics album and extracting annotation data from said reference material. Then, processing the extracted annotation data by a natural language processor to produce search keywords. User directive data is then received and processed by the natural language processor to produce additional keywords. Both the keywords and additional keywords are prioritized followed by querying a graphical material database through a network connection in accordance with the keywords. Then, receiving from the database at least one resultant graphical material and selecting one or more of the resultant graphical material for insertion into the digital graphics album. However, if none of the resultant graphical materials is selected, specifying at least one reference graphic material indicative of a desired search result and processing the reference graphical material to produce search criteria that are image content descriptors. Using the image content descriptors, querying an image content database through a network connection, and receiving from the image content database at least one resultant image. Having received the resultant image or images, selecting at least one of the resultant images, and inserting the selected resultant image in the digital graphics album.

In addition to the method described above, an illustrative apparatus of the present invention is disclosed. The apparatus is a digital graphics albuming system for searching a graphical material database, and the apparatus includes a display, an input device, a network interface, a memory, and a processor coupled to the display, the input device, the network interface and the memory. The processor, which is inherently a general purpose machine is programmed to implement the forgoing function of the present invention, and, in one illustrative embodiment, the processor is operable to store a digital graphics album in the memory, and the processor is operable to recall a portion of the digital graphics album and display the portion of the digital graphics album on the display. The processor is operable to receive a selection of reference material from the input device, and the processor is operable to process this reference material to produce search criteria. The processor is operable to couple the search criteria to the network interface and access a graphical material database there through, and thereby enabling a search that returns at least one resultant graphical material. The processor is operable to receive at least one resultant graphical material from the network interface, and the processor is operable to display the resultant graphical material on the display and to receive a selection input specifying at least one of the resultant graphical materials from the input device. The processor is operable to store the selected resultant graphical material in the memory as a part of the digital graphics album.

These and other aspects, objects, features and advantages of the present invention will be more clearly understood and appreciated from a review of the following detailed description of the preferred embodiments and appended claims, and by reference to the accompanying drawings.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
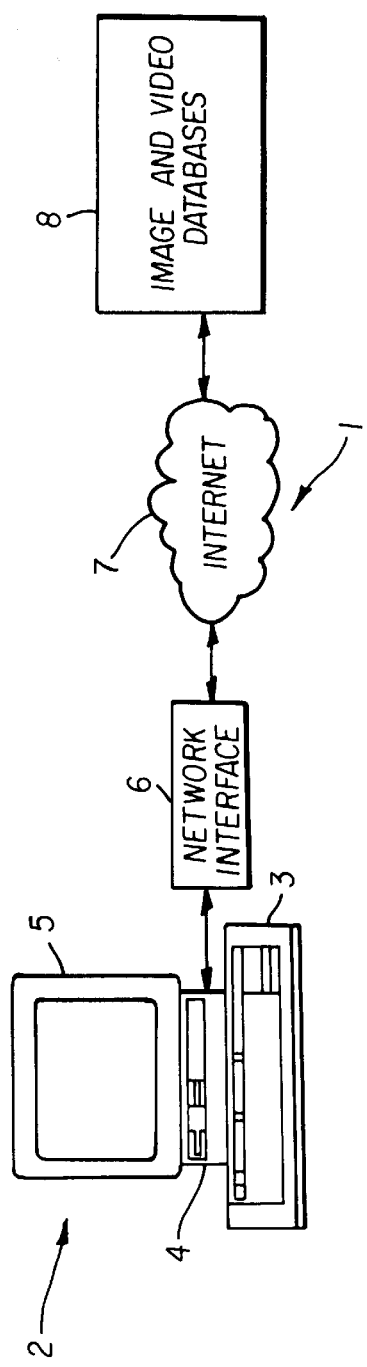
FIG. 1 is a diagram of the apparatus of an illustrative embodiment of the present invention.

Reference is directed to FIG. 1 which is a diagram of the apparatus of an illustrative embodiment of the present invention. The apparatus and methods utilize a computer 2 that has an input device 3, which is typically a keyboard, but could be other input devices such as a touch screen, character recognition system, mouse, track ball, touch pad, or other human interface device or peripheral. The input device 3 is coupled to processing unit 4 which includes a processor, memory, power supply, input/output circuits, mass storage devices and other circuits and devices typically found in a computer. The processing unit may be a personal computer, such as an IBM PC compatible personal computer. The processing unit 4 is coupled to a display 5 which serves as a video display for visual user interface to the user. Any of the commonly used computer visual display device may be utilized, including, but not limited to, cathode ray tubes, matrix displays, LCD displays, TFT displays, and so forth.

The processing unit 4 is also coupled to a network interface 6. The network interface 6 is here illustrated as being outside of the processing unit 4, but could be located inside the processing unit 4, as well. The network interface can be any device, or even a simple conductive circuit, to interface the processing unit 4 to an external network 7 or device. This illustrative embodiment illustrates the Internet 7 as the external network, however, the networks utilized could be a private network, an intranet, the Internet, a commercial network, or other network which hosts a database of graphical data. Respecting the network interface device 6, this could be a conventional dial-up modem, an ADSL model, an ISDN interface, a cable modem, direct hardwire, a radio modem, an optical modem or any other device suitable for interconnecting the processing unit 4 to an external network 7, as described previously.

While not a part of this illustrative embodiment, the present invention relies upon access to a graphical material database 8 as the source of graphical material used to supplement the digital graphics album. The requirements of such a database 8 will be more fully discussed hereinafter.

Figure 2:
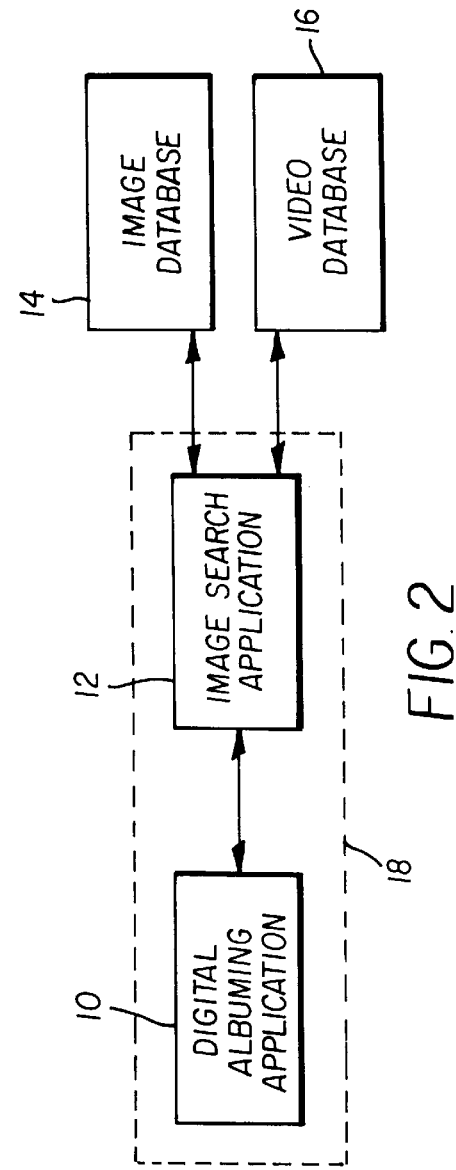
FIG. 2 is a functional block diagram of the software applications in an illustrative embodiment of the present invention.

References is directed to FIG. 2 which is a functional block diagram of the software applications in an illustrative embodiment of the present invention. The digital albuming application 10, as was discussed earlier runs on the processor 4. In addition, the digital graphic album search application 12 runs on the same processor 4. In this illustrative embodiment, the two are shown as running on the same processor 18. It is the image search application 12, in this illustrative embodiment, that executes a portion of the claimed methods in the present invention. The image search application communicates to the external graphical material databases. In the first example, it is a digital image database 14 and/or a digital video database 16. Such a database comprises a number of digital graphical materials that are accessible by a search function. Typically, the database is a relational database indexed by a plurality of indices. The conventional approach to search such a database is to provide one or more prioritized keywords. The database responds to such a request with a search result that lists a number of hits. In the case of a graphical material database, these are called resultant graphical materials.

It is understood by those skilled in the art that databases such as 14 and 16 may use more sophisticated indexing strategies and that any such database would be applicable to the present invention. For example, the graphical images may be indexed based on image content descriptors, rather than keywords. Where keywords may describe the circumstances surrounding the image, things such as the who, what, where, when, and why parameters, content descriptors actually describe the data within the digital graphical material. Such factors are derived from the image itself and may include a color histogram, texture data, resolution, brightness, contrast and so forth.

The source of the graphical material databases may be existing databases such as stock photo databases or private databases. Where a stock database is used, the user will be required to pay a copyright fee for access to the graphical materials. This is a basic subscription transaction that is well understood by those skilled in the art. In the case of a private database, the supplier of the albuming software or search software may provide access for users to a database of graphical materials. This could be handled as a subscription or as an incentive to users to purchase the software. It is also foreseeable that public sites will develop for dissemination of graphical materials.

Figure 3:
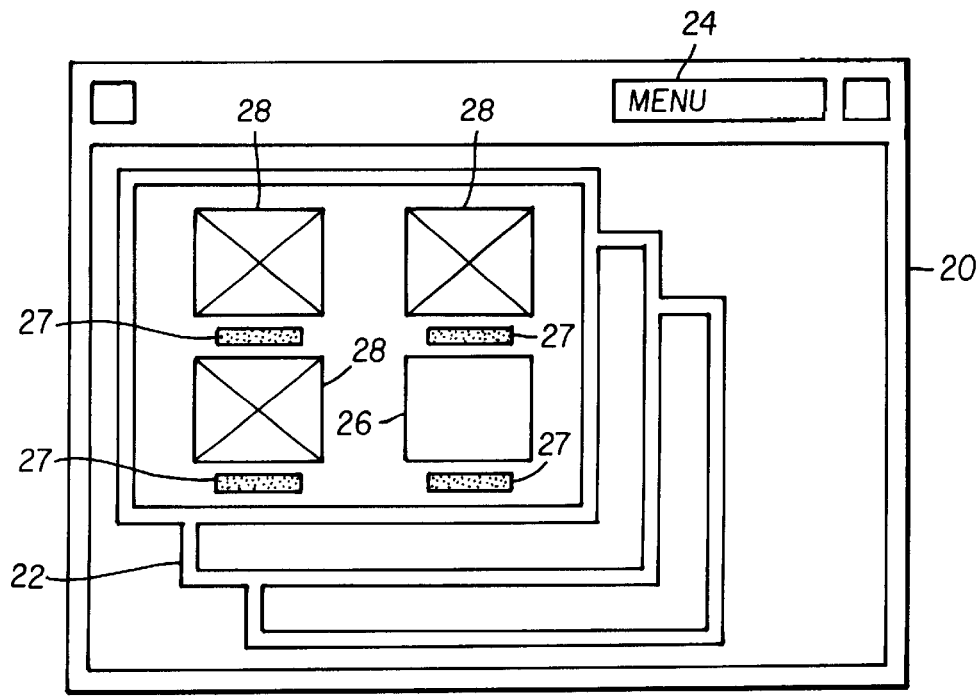
FIG. 3 is a diagram of the display when reference material is selected in the digital graphics album.

Reference is directed to FIG. 3 which is a diagram of the display in which a user specifies reference material in the digital graphics album. The display 20 appears on the screen of a personal computer. The display 20 has a pull-down menu 24 in this illustrative embodiment. The albuming application has multiple album pages 22 that appear on the screen 20. On the front page, in this example, four graphic materials appear 28 and 26, each of which as some annotation 27 associated therewith. In one illustrative embodiment, if the graphic materials are digital photographs, and the annotation is a brief description of the event in the photograph.

The user reviews the graphic materials and may decide that additional materials would improve the album, especially if the additional materials logically augmented some of the existing materials. The user specifies some of the graphical materials in the album as reference materials by highlighting them as shown 28. By doing this, the user is establishing a reference from which new materials may be searched for and added to the album.

Figure 4:
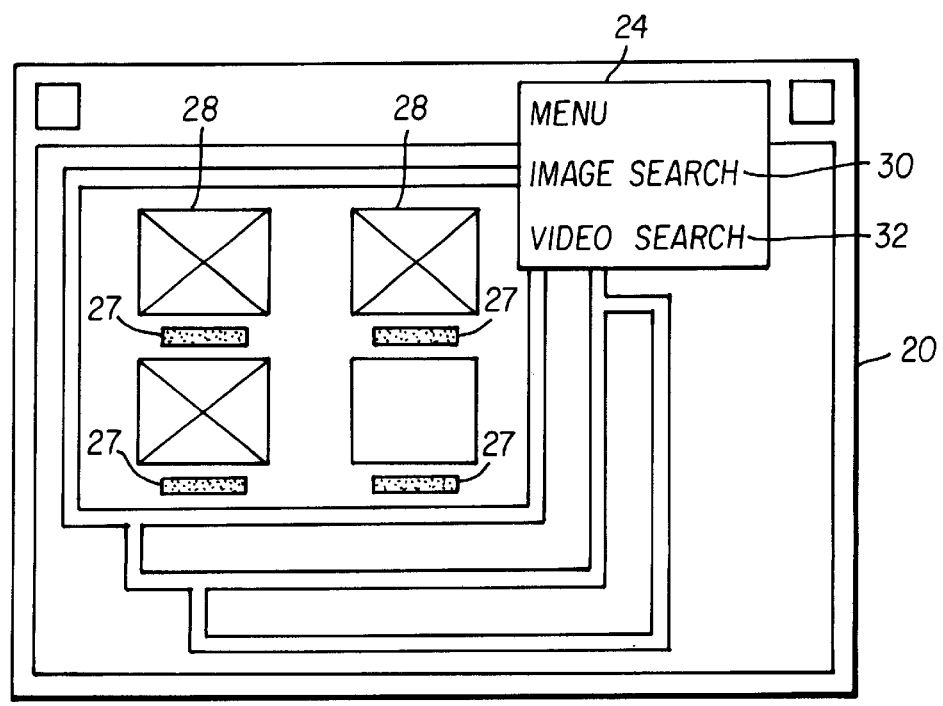
FIG. 4 is a diagram of the display when a search is selected in an illustrative embodiment of the present invention.

Reference is directed to FIG. 4 which is a diagram of the display used when a user initiates a search for additional graphical materials. In the display 20 is the pull-down menu 24, which is selected by the user to initiate a search. The menu, in this illustrative embodiment, allows the user to select an image search 30 or a video search 32. It would also be reasonable to select a unified search for both digital images and video clips if desired. In this illustrative embodiment of the present invention, separate graphical material databases are used for digital images and video clips. For this reason, the search is directed to one of two of these sources of digital graphical materials. It will be understood by those skilled in the art that a single search could access a plurality of database and that the selection of the search type does not necessarily need to limit the search to a single database. Once the user has selected the search type, the content of the reference graphical materials, which is digital images 28 and their respective annotation 27 in this example, are subsequently used to direct the search to produce results consistent with the user selection. The process of generating keywords and annotation of images is discussed in U.S. Pat. No. 5,493,677 to Balogh et al. For GENERATING, ARCHIVING, AND RETRIEVAL OF DIGITAL IMAGES WITH EVOKED SUGGESTION-SET CAPTIONS AND NATURAL LANGUAGE INTERFACE, the substance of which is hereby incorporated by reference.

Figure 5:
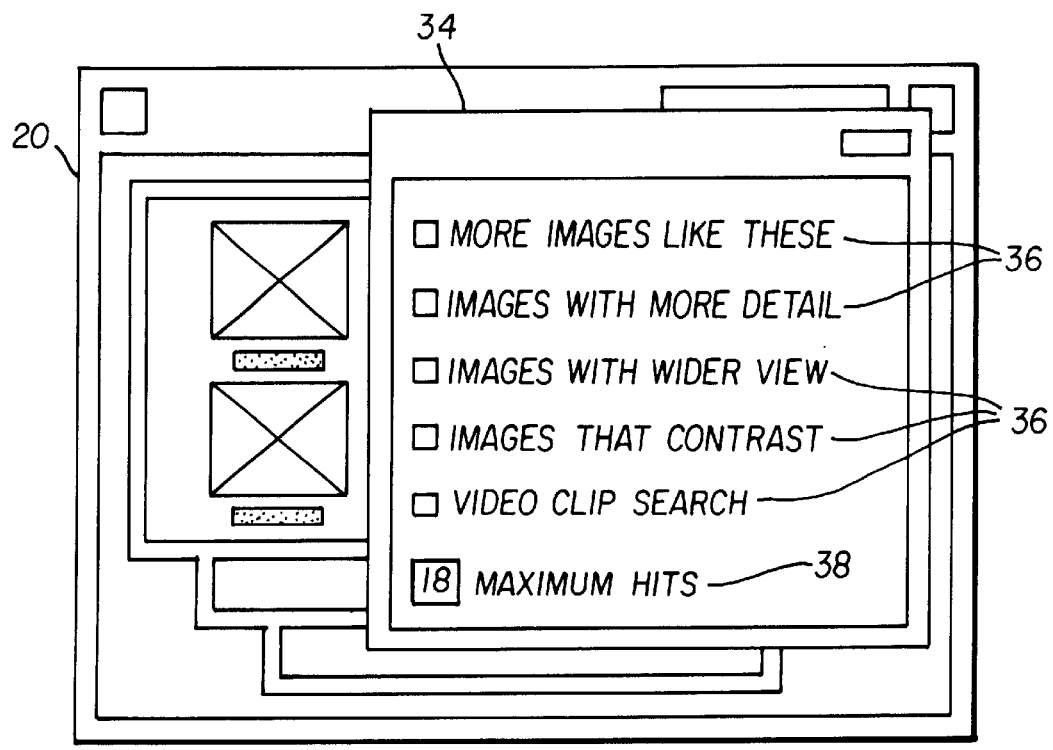
FIG. 5 is a diagram of the display requesting user directives for a search in an illustrative embodiment of the present invention.

Reference is directed to FIG. 5. After the user has initiated a search, the processor of this illustrative embodiment of the present invention processes that reference material to produce search criteria. This aspect will be more fully discussed hereinafter, but in this present example, the user has selected three digital images with annotations so the processor extracts the annotation data and processes it to produce a set of search keywords. These keywords establish the criteria of the subsequent search. However, these keywords are augmented in FIG. 5 by the addition of user directives. Essentially, a pop-up display 34 is overlaid on screen 20 and offers a range of options 36 to the users. Since a search may produce very large amounts of relevant search result, the pop-up display 34 also allows the user to limit the number of resultant graphical materials at option 38. In this example, eighteen resultant graphical materials.

Considering again the range of options 36 offered to the user, in this example the options are: MORE IMAGES LIKE THESE which will cause the processor to prioritize and augment the search to produce results similar to the annotation keywords; IMAGES WITH MORE DETAILS which will cause the processor to prioritize and augment the keywords to produce search results producing detailed images similar to those references selected; IMAGES WITH WIDER VIEWS which will cause the processor to prioritize and augment the keywords to produce resultant images with more expansive views; and IMAGES THAT CONTRAST which will cause the processor to prioritize and augment the keywords to produce search results that are in contrast with the selected reference materials. Another option is VIDEO CLIP SEARCH in this example, which will cause the processor to direct a search to video clips related to the selected digital images. In this case, the video clip can be represented by key frames that have been extracted a prior, for content-based matching. It should be understood that the foregoing list is not exhaustive. Other criteria for contouring the search to the user directives can be defined and would be understood by those skilled in the art. In another illustrative embodiment, a text window can be offered for the user to enter additional keywords. In the example of wanting a picture of the Eiffel Tower, the user might merely type in "get me a picture of the Eiffel Tower" and the processor would process this request along with the selected reference materials to search for an image of the Eiffel tower that is consistent the reference graphical materials selected.

Figure 6:
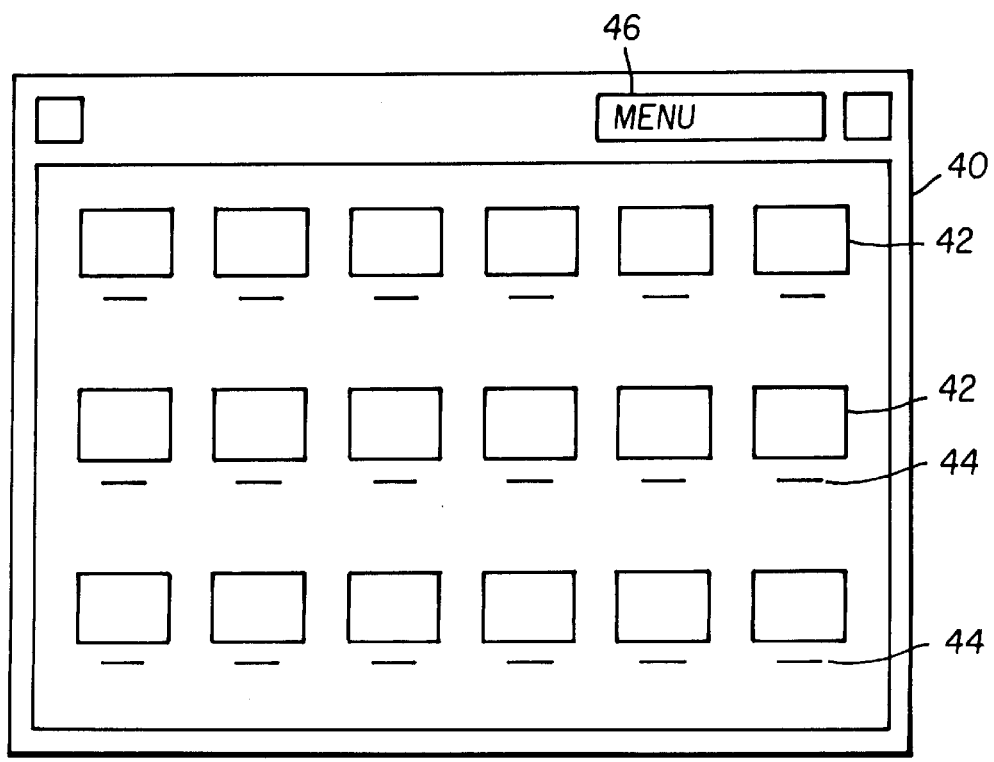
FIG. 6 is a diagram of the display when resultant graphical material are displayed in an illustrative embodiment of the present invention.

Reference is directed to FIG. 6 which is a diagram of the display after the database search has been conducted in an illustrative embodiment of the present invention. In this example the screen 40 displays a plurality of resultant graphical materials 42 that may have associated annotation data 44, if the search database offered such information. In addition, a menu option 46 is present. The user reviews the images to determine if one or more of them are deemed suitable for inclusion into the user's digital photo album. If so, the images are selected and placed in the album. This placement can be by any means, and may include a drag and drop interface for convenience.

In some applications, the image resolution may be high and therefore the search may produce initial resultant materials that are lower resolution, or thumbnail, representations of the final image for review. This has the advantage of increasing the speed of the search and reducing the download time of images that may not ultimately be selected. Once an image is selected, based on the thumbnail representation, a full resolution version can be downloaded for inclusion in the album.

Figure 7:
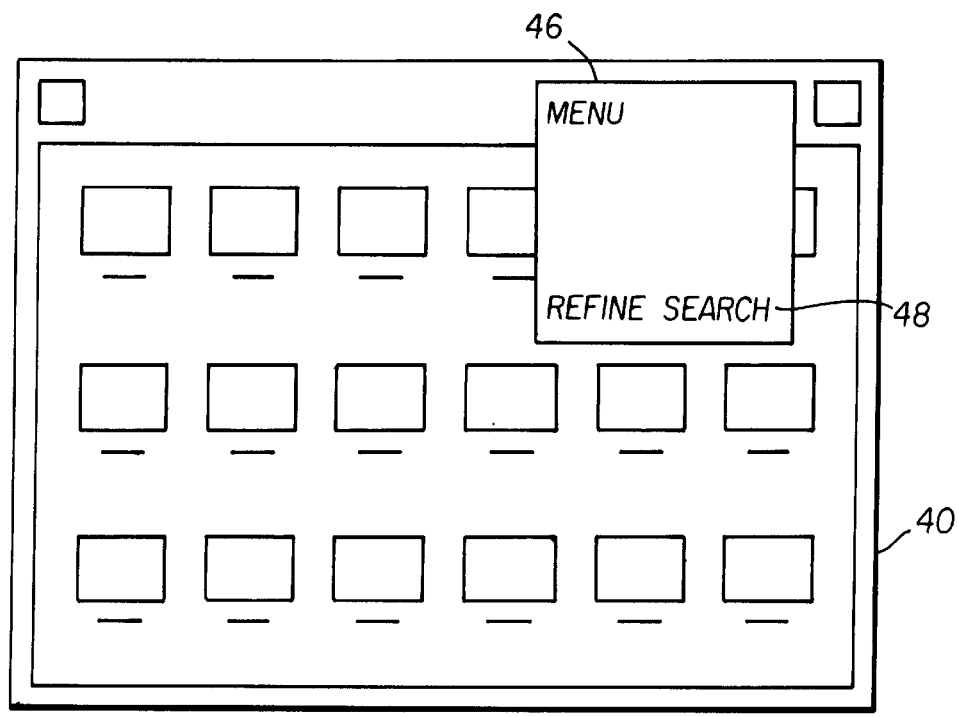
FIG. 7 is a diagram of the display of a user menu in an illustrative embodiment of the present invention.
Figure 8:
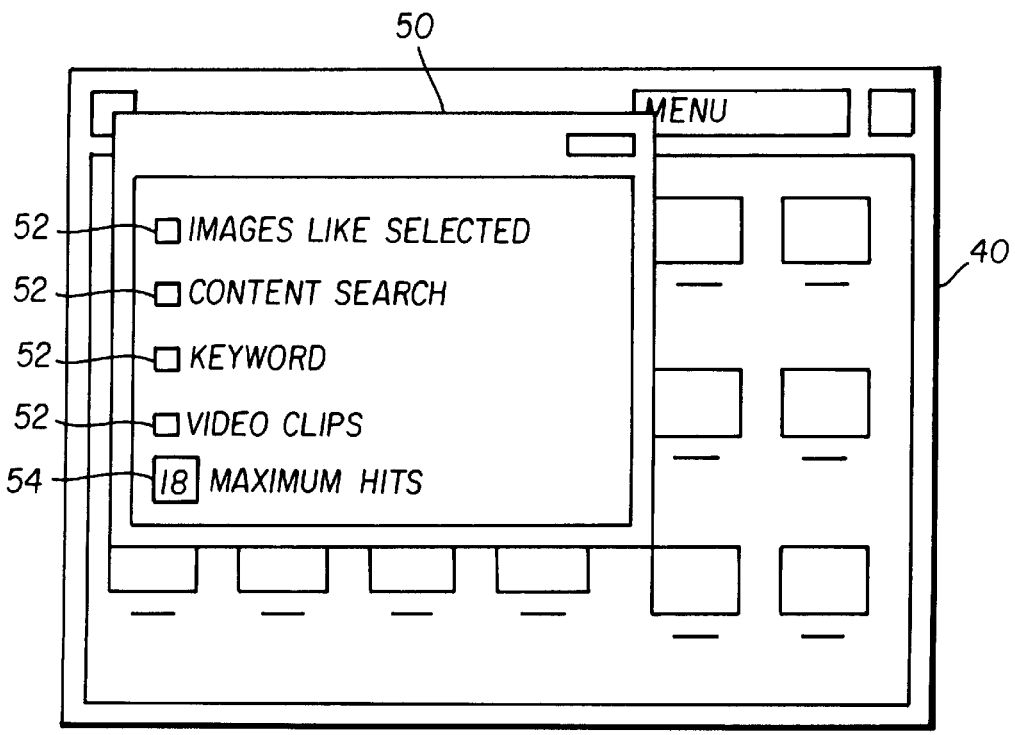
FIG. 8 is a diagram of the display requesting an refined search in an illustrative embodiment of the present invention.

Reference is directed to FIG. 7 which is a diagram of the display after the search results have been received. In this instance, the user has reviewed the resultant graphical materials and determined that none of the images are desirable for inclusion in the album. The screen 40 includes menu 46 which offers a choice 48 to refine the search. The user selects this and the process proceeds to the screen depicted in FIG. 8. At this point, in FIG. 8, the present invention contemplates that an offer to refine the search be presented to the user. On top of the previous screen 40, a pop-up menu 50 offers additional choices 52. Since another search will be conducted to refine the results, the user is again offered a choice 54 to limit the number resultant graphical materials from the search. The user may choose to more narrowly construe the keywords previously produced by selecting IMAGES LIKE SELECTED, or may enter specific keywords to refine the search by selecting KEYWORD. Also, the user may elect to conduct a video clip search by selecting VIDEO CLIP.

However, there may be situations where the keyword data is insufficient to produce the results desired by the user. This may be because of insufficient annotation materials, or because the desired results are not easily described by words. In such situations, the user can select that CONTENT SEARCH option in pop-up menu 50. A content search is not based on keywords, but rather on the content of the reference images themselves, sometimes called the visual characteristics. If selected, the processor analyzes the images to produce metrics of the image content which may include a color histogram, textural data, contrast, brightness, geometric information and other data. Details of such a search and cataloging approach can be found in U.S. Pat. No. 5,751,286 to Barber et al. For IMAGE QUERY SYSTEM AND METHOD, the substance of which is hereby incorporated by reference. This option affords an alternative to the keyword search. It should be understood that the option to conduct a content search may be manually selected, as described in this illustrative embodiment, or may be accomplished automatically by the processor which the initial search results have been otherwise deemed inadequate.

The results of the content search are offered to the users in a manner as was previously described.

Figure 9:
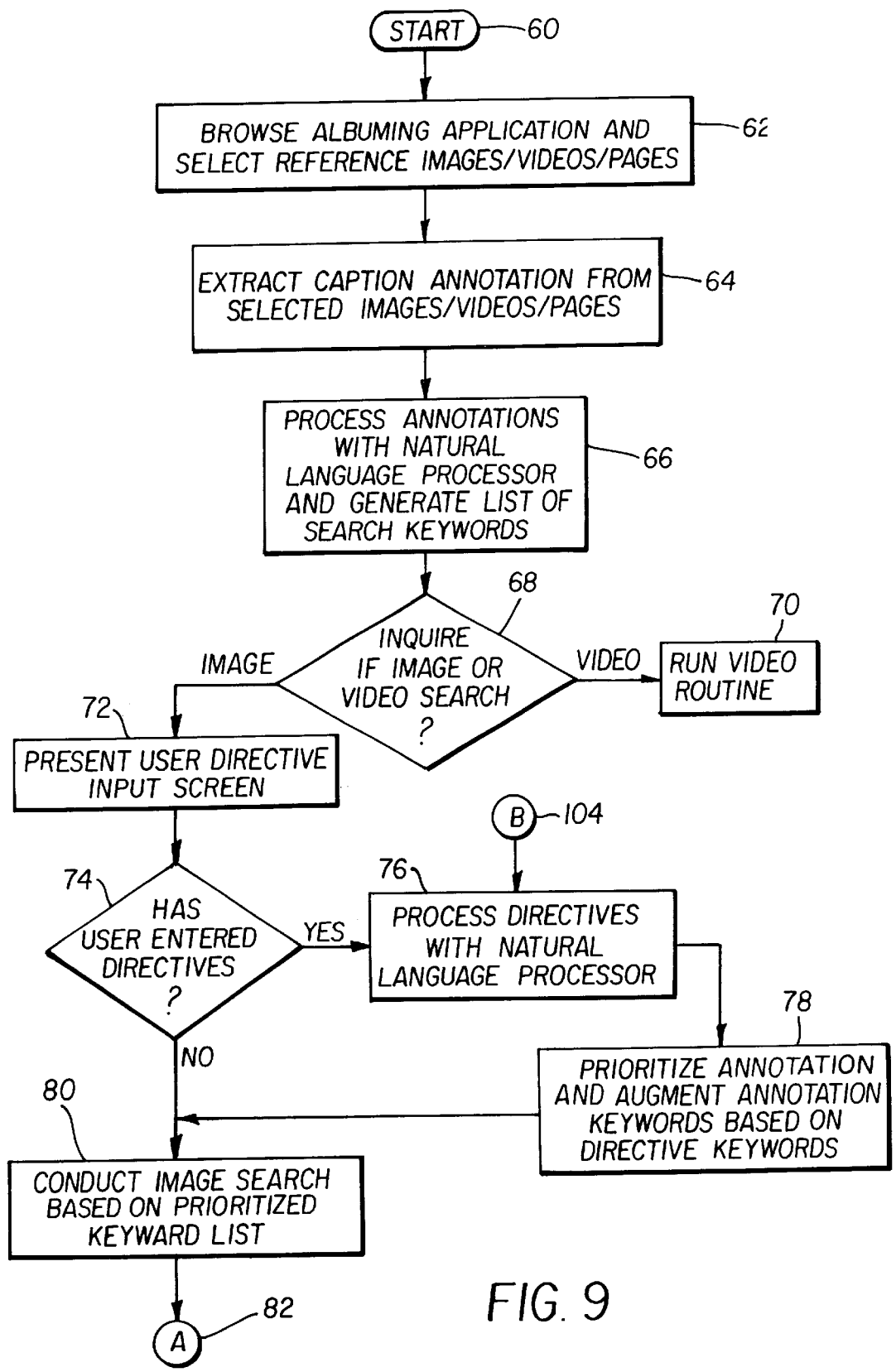
FIG. 9 is a page one of three of a flow diagram of an illustrative embodiment of the present invention.

Reference is directed to FIG. 9 which is the first of three figures depicting a flow chart of an illustrative embodiment of the present invention. The process begins at step 60 and immediately proceeds to step 62 where the user browses an albuming application and decides that additional graphical materials are needed and therefore selects certain reference material from the album that may be in the form of digital images, video clip key frames, of other graphical materials that may reside in the album. At step 64, the processor extracts the annotation data from the selected reference materials as the initial search will be a keyword search.

At step 66, the processor processes the annotation data in accordance with a natural language processing routine. Natural language processing routines are known in the art and in this instance are used to extract the who, where, what, why, and when metrics of the annotation data, as these are the kinds of metrics that are useful in association with graphical information in a digital graphics album. For a more detailed discussion of natural language processing, see U.S. Pat. No. 5,963,940 to Liddy et al. For NATURAL LANGUAGE INFORMATION RETRIEVAL SYSTEM AND METHOD; and U.S. Pat. No. 5,590,039 to Ikeda et al. for NATURAL LANGUAGE PROCESSING APPARATUS AND METHOD FOR PERFORMING PROCESSING TO ANALYZE THE MEANING OF AN INPUT SENTENCE ENTERED IN THE FORM OF A NATURAL LANGUAGE; and U.S. Pat. No. 6,052,656 to Suda et al. for NATURAL LANGUAGE PROCESSING SYSTEM AND METHOD FOR PROCESSING INPUT INFORMATION BY PREDICTING KIND THEREOF, each of which is hereby incorporated by reference.

The result of the natural language processing is a list of prioritized keywords that are used to drive the search of one or more relational databases. Continuing in FIG. 9, at step 68, the processor inquires as to whether the desired search is a digital image search or a video clip search. If a video clip search is selected, a video search routine is run at step 70. The video clip routine closely parallels the image search routine which will be discussed next. One difference is that a separate data base is searched. Another difference is that the video clip is not reference material in and of itself, it may be annotated so the keyword aspects are the same as with digital image searches. In the video clip circumstance, the video clip is represented by a key frame. This is a single frame, selected from the numerous frames in the video clip, that is used to represent the video in the album display presentation. Therefore, the video clip routine is not detailed in this figure as it can deduced by those skilled in the art by referring to the image routine. It should also be noted that a search for a digital image and a search for a digital graphic is identical, differing only in the original source of the image information, and not in the storage and retrieval of them.

Continuing in FIG. 9, if an image search is selected at step 68, the processor presents the user directive input screen at step 72 for entry of user directives. At step 74 the processor tests to determine what, if any, user directives have been received. If user directives have been selected, the user directives are processed with the natural language processor at step 76 to produce additional keywords, called directive keywords, in this example. The keywords derived from the annotations and the keywords derived from the directives are prioritized and augmented at step 78 to produce a set of search keywords more closely tailored to the user's intent. In the event the user has not entered directives at step 74, or if there were directives which were processed through to step 78, the processor initiates an image search with the available keywords at step 80. Process then flows through node 82 in FIG. 9 to node 82 in FIG. 10.

Referring back to FIG. 9, block 80, where the processor initiates the graphical material database search, it should be noted that a decision on what database or databases to search must be made. The user will have control over this aspect of the search in another portion of the present invention, which is not illustrated. The database may be a commercial stock photograph database, or it could be a private database accessible only to users of the present invention. Or, other kinds of database services may evolve to meet the demand for this kind of service. In any event, the user will have specified the databases beforehand so that the processor identifies the appropriate database and is given a path to access it. Such a path may be an Internet IP address, a uniform resource locator (URL), or any other address in a public or private network.

Figure 10:
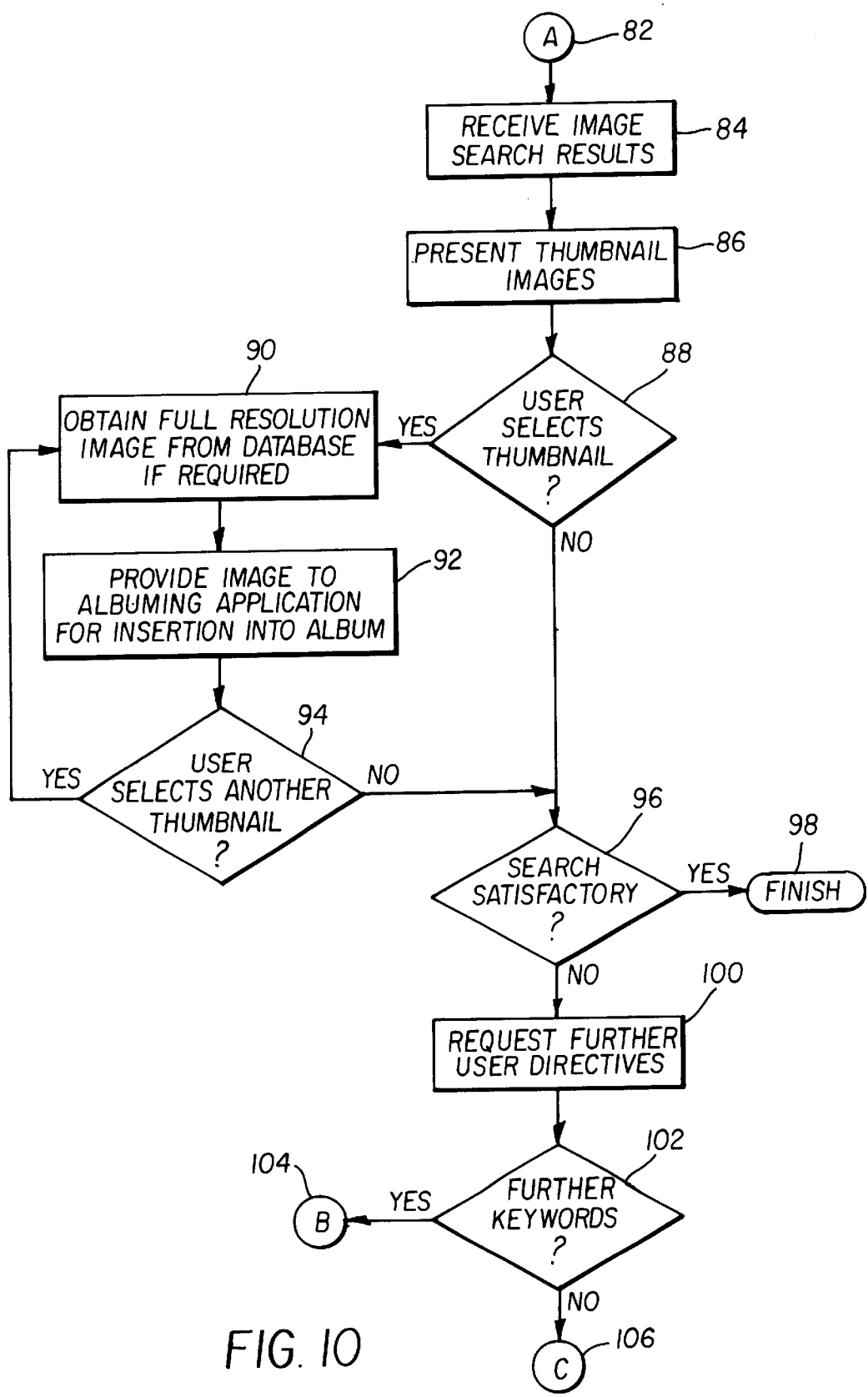
FIG. 10 is a page two of three of a flow diagram of an illustrative embodiment of the present invention.

The process continues in FIG. 10, which is page two of three of the flow diagram. The database search will typically return a plurality of graphical material which are received by the processor at step 84. If the images are in reduced resolution, or thumbnail, form, they are present to the user at step 86 where they are displayed on the display for review. Of course, if the images are provided in full resolution form, they are displayed in full resolution form at step 86. The user reviews the displayed graphical materials and at step 88 may select one or more of them for inclusion in the album.

At step 88, if the user selects one or more graphical materials, and if thumb nails where provided as the search results, then the processor requests full resolution versions of the graphical materials from the database at step 90. The graphical material is then presented to the albuming application at step 92 where it is inserted into the album. If the user selects another graphical material at step 94, the flow recirculates to step 90 where the download and insertion are reiterated on an image by image basis.

Once all of the graphical materials are inserted at step 94, or if the user failed to select any graphical materials at step 88, the processor inquires with the user as to whether the search results were satisfactory or not at step 96. If the answer is yes, the process finishes at step 98. On the other hand, if the search was not satisfactory at step 96, the process requests further directives from the user at step 100 for use in refining the search. If the user provides additional keywords to this request at step 102, the flow continues through node 104 back to step 76 in FIG. 9 to reiterate the previously described search procedure, but with the newly added keywords from step 100. On the other hand, if further keywords were not provided at step 100, step 102 directs flow through node 106 to step 108 in FIG. 11.

Figure 11:
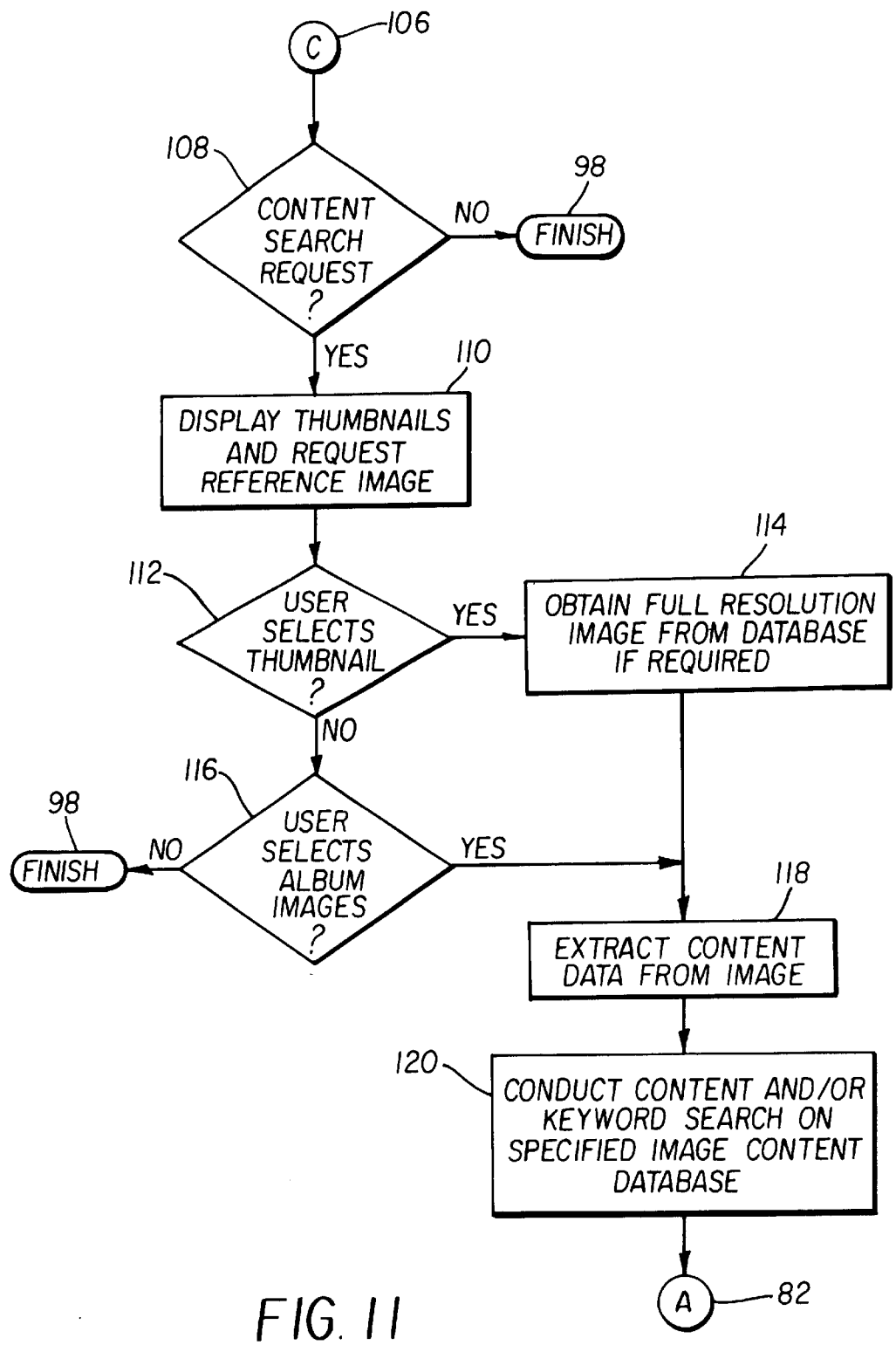
FIG. 11 is a page three of three of a flow diagram of an illustrative embodiment of the present invention.

Referring to FIG. 11, which is page three of three of the flow diagram, the processor test to determine if the user has requested a content search at step 108. If no content search was requested, the process is finished at step 98. On the other hand if a content search was requested, flow continues to step 110 where images, or thumbnail images from the album are presented to the user for selection of a reference image or images. At this point, the user is changing the focus of the search from using keywords to describe what is being search for to using existing image content to define what is being searched for. At step 112, if the user has selected a thumbnail image, the processor obtains a full resolution image at step 114. On the other hand, at step 112, if the user has not selected thumbnail images, the user may select an image from the album at step 116. If no image is selected, the process is finished at step 98.

If full images are obtained from the database at step 114 or if the user selects images from the album at step 116, the processor extracts content information at step 118. The process was described hereinbefore. The content data is then provided to a database which is indexed by content at step 120. Upon receipt of resultant graphical material at step 120, the flow re-circulates to step 84, through node 82, where the search results are handled as was previously described.

Thus, the present invention has been described herein with reference to a particular embodiment for a particular application. Those having ordinary skill in the art and access to the present teachings will recognize additional modifications, applications and embodiments within the scope thereof. For example, It is therefore intended by the appended claims to cover any and all such applications, modifications and embodiments within the scope of the present invention.

What is claimed is:

1. A system for adding graphical material to a digital graphics album having a plurality of digital images, comprising:

means for displaying said digital graphics album;

means for specifying a user selection of said digital images during said displaying, to define reference material in said digital graphics album;

means for processing said reference material to produce prioritized search criteria data that is extracted from the reference material;

means for receiving user directive data;

means for processing said received directive data by a natural language processor to produce additional keywords;

means for prioritizing said keywords and said additional keywords;

means for querying a graphical material database through a network connection in accordance with said prioritized keywords;

means for receiving from said database at least one resultant graphical material;

means for upon not selecting said at least one resultant graphical material, automatically processing said reference material to produce search criteria that are image content descriptors of said reference material;

means for querying a graphical material database in accordance with said search criteria data;

means for receiving from said database at least one resultant graphical material; and means for inserting said resultant graphical material in the digital graphics album.

2. A system of claim 1 further comprising:

means for selecting at least one of said at least one resultant graphical material.

3. The system of claim 1 and wherein said means for querying is an Internet connection to a private graphical material database.

4. The system of claim 1 wherein said resultant graphical material is a reduced resolution graphical material, further comprising:

means for transferring a full resolution graphical material from said graphical material database in accordance with said reduced resolution graphical material for use as said selected resultant graphical material by said meana means for inserting.

5. The system of claim 1 wherein:

said album has a plurality of digital images and associated annotations, said means for displaying displays said annotations during said specifying, said reference material includes respective said annotations.

6. The system of claim 5 and wherein said means for processing utilizes a natural language processor to process said annotations of said reference material.

7. The system of claim 6 and wherein said search criteria data are indicative of the who, what, where, when, or why aspects of said annotations.

8. The system of claim 6 and wherein:
said means for processing processes respective said annotations of said reference material to produce prioritized keywords, and
said search criteria data further comprises said prioritized keywords.

9. The system of claim 5 wherein:
said means for processing processes respective said annotations of said reference material to produce keywords, and further comprising:
means for receiving user directives;
means for processing said received directives to produce additional keywords, and prioritizing said keywords and said additional keywords to provide a set of prioritized keywords;
wherein said search criteria data is said set of prioritized keywords.

10. The system of claim 1 and wherein said reference material includes respective said digital images.

11. The system of claim 10 and wherein said search criteria data are image content descriptors.

12. The system of claim 11 and wherein said means for querying employs an Internet connection to a private graphical material database which is indexed by image content descriptors.

13. The system of claim 10 wherein said album includes a plurality of annotations associated with said digital images, said reference material includes respective said annotations, and said search criteria data are keywords extracted from said annotations of said reference material.

14. The system of claim 13 and wherein said means for processing utilizes a natural language processor to process said annotations of said reference material.

15. The system of claim 14 further comprising:
means for receiving user directives;
means for processing said received directives to produce additional keywords, and
means for prioritizing said keywords and said additional keywords to more narrowly define said querying.

16. The system of claim 14 and wherein said search criteria data are indicative of the who, what, where, when, or why aspects of said annotations.

17. The system of claim 1 and wherein said album includes at least one video clip and said reference material includes a video clip key frame of said video clip.

18. The system of claim 17 and wherein said search criteria data are image content descriptors of said video clip key frame.

19. The system of claim 18 and wherein said means for querying employs an Internet connection to a private graphical material database which is indexed by image content descriptors.

20. The system of claim 17 wherein said video clip key frame has an associated annotation;
and said search criteria data are keywords extracted from said annotation.

21. The system of claim 20 and wherein said means for processing utilizes a natural language processor to process said annotation.

22. The system of claim 20 further comprising:
means for receiving user directives;
means for processing said received directives to produce additional keywords, and
means for prioritizing said keywords and said additional keywords to more narrowly define said querying.

23. The system of claim 21 and wherein said search criteria data are indicative of the who, what, where, when, or why aspects of said annotation.

24. A digital graphics albuming system for searching a graphical material database; comprising:
a display;
an input device;
a network interface;
a memory;
a processor coupled to said display, said input device, said network interface and said memory, and wherein
said processor is operable to recall and display a plurality of graphical materials of a digital graphics album on said display, and said processor is operable to receive a user selection of one or more of said graphical materials, during said display, to define reference material, and said processor is operable to produce a list of prioritized search criteria that is extracted from said reference material said processor is operable to receive user directive data, process said received directive data by a natural language processor to produce additional keywords, prioritize said keywords and said additional keywords, query a graphical material database through a network connection in accordance with said prioritized keywords, receive from said database at least one resultant graphical material and upon not selecting said at least one resultant graphical material, automatically processing said reference material to produce search criteria that are image content descriptors of said reference material, and said processor is operable to couple said search criteria to said network interface, and said processor is operable to receive and display said at least one resultant graphical material from said network interface, and to receive a selection input specifying at least one of said at least one resultant graphical material from said input device, and said processor is operable to store said selected resultant graphical material in said memory as a part of said digital graphics album.

25. The system of claim 24 and wherein said network interface is an Internet network interface.

26. The system of claim 24 and wherein resultant graphical material is a reduced resolution graphical material, and said processor is operable to receive a full resolution graphical material from said graphical material database through said network interface in accordance with said reduced resolution graphical material, and said processor is operable to store said full resolution graphical material in said memory as a part of said digital graphics album.

27. The system of claim 24 and wherein
said album has a plurality of digital images and associated annotations,
said means for displaying displays said annotations during said specifying,
said reference material includes respective said annotations.

28. The system of claim 27 and wherein said processor is operable as a natural language processor to process said said annotations of said reference material to produce search criteria that are search keywords.

29. The system of claim 27 and wherein said processor is operable to process respective said annotations of said reference material to produce keywords and to receive user directives from said input device, and said processor is operable to process said user directives to produce additional keywords, and said processor is operable to prioritize said keywords and said additional keywords to provide a set of prioritized keywords; and wherein said list of prioritized search criteria is said set of prioritized keywords.

30. The system of claim 24 and wherein said reference material includes respective said digital images.

31. The system of claim 30 and wherein said processor is operable to process said digital image of said reference material to produce image content descriptors.

32. The system of claim 30 and wherein said album includes a plurality of annotations associated with said digital images, said reference material includes respective said annotations, said processor is operable as a natural language processor to process said annotations of said reference material to produce search criteria that are search keywords.

33. The system of claim 32 and wherein said processor is operable to receive user directives from said input device, and said processor is operable to process said user directives to produce additional keywords, and said processor is operable to prioritized said search keywords and said additional keywords.

34. The system of claim 24 and wherein said album includes at least one video clip and said reference material includes a video clip key frame of said video clip.

35. The system of claim 34 and wherein said processor is operable to process said video clip key frame to produce image content descriptors of said video clip key frame.

36. The system of claim 35 and wherein said video clip key frame has an associated annotation and said processor is operable as a natural language processor to process said annotation to produce search criteria data that are keywords.

37. The system of claim 36 and wherein said processor is operable to receive user directives from said input device, and said processor is operable to process said user directives to produce additional keywords, and said processor is operable to prioritized said search keywords and said additional keywords.

38. A method of adding graphical material to a digital graphics album, comprising the steps of:

displaying a plurality of graphical materials of the digital graphics album;

during said displaying, specifying a user selection of said graphical materials to define reference material in said digital graphics album;

processing said reference material to produce a list of prioritized search criteria data that is extracted from said reference material;

receiving user directive data;

processing said received directive data by a natural language processor to produce additional keywords;

prioritizing said keywords and said additional keywords;

querying a graphical material database through a network connection in accordance with said prioritized keywords;

receiving from said database at least one resultant graphical material;

upon not selecting said at least one resultant graphical material, automatically processing said reference material to produce search criteria that are image content descriptors of said reference material;

querying a graphical material database in accordance with said search criteria data;

receiving from said database at least one resultant graphical material, responsive to said querying; and inserting said resultant graphical material in the digital graphics album.

39. The method of claim 38 further comprising the step of: selecting at least one of said at least one resultant graphical materials for insertion.

40. The method of claim 38 and wherein said querying step is accomplished through an Internet connection to a private graphical material database.

41. The method of claim 38 wherein said resultant graphical material is a reduced resolution graphical material, further comprising the step of: transferring a full resolution graphical material from said graphical material database in accordance with said reduced resolution graphical material for use as said selected resultant graphical material in said inserting step.

42. The method of claim 38 wherein:

said album has a plurality of digital images and associated annotations, said displaying of said annotations is during said specifying, and said reference material includes respective said annotations.

43. The method of claim 42 and wherein said processing step utilizes a natural language processor to process said annotations of said reference material.

44. The method of claim 43 and wherein said search criteria data are indicative of the who, what, where, when, or why aspects of said annotations.

45. The method of claim 43 and wherein:

said processing step processes respective said annotations of said reference material to produce prioritized keywords, and said search criteria data further comprises said prioritized keywords.

46. The method of claim 42 wherein:

said processing processes respective said annotations of said reference material to produce keywords, and further comprising the steps of:

receiving user directives;

processing said received directives to produce additional keywords; and prioritizing said keywords and said additional keywords provide a set of prioritized keywords;

wherein said search criteria data is said set of prioritized keywords.

47. The method of claim 39 and wherein said reference material includes respective said digital images.

48. The method of claim 47 and wherein said search criteria are image content descriptors.

49. The method of claim 48 and wherein said querying step is accomplished through an Internet connection to a private graphical material database which is indexed by image content descriptors.

50. The method of claim 47 wherein said album includes a plurality of annotations associated with said digital images, said reference material includes respective said annotations, and said search criteria data are keywords extracted from said annotations of said reference material.

51. The method of claim 50 and wherein said processing step utilizes a natural language processor to process said annotations of said reference material.

52. The method of claim 51 further comprising the steps of:

receiving user directives;

processing said received directives to produce additional keywords; and prioritizing said keywords and said additional keywords to more narrowly define said querying step.

53. The method of claim 51 and wherein said search criteria data are indicative of the who, what, where, when, or why aspects of said annotations.

54. The method of claim 38 and wherein said album includes at least one video clip and said reference material includes a video clip key frame of said video clip.

55. The method of claim 54 and wherein said search criteria are image content descriptors of said video clip key frame.

56. The method of claim 55 and wherein said querying step is accomplished through an Internet connection to a private graphical material database which is indexed by image content descriptors.

57. The method of claim 54 wherein said video clip key frame has an associated annotation, and said search criteria data are keywords extracted from said annotation.

58. The method of claim 57 and wherein said processing step utilizes a natural language processor to process said annotation.

59. The method of claim 57 further comprising the steps of:

receiving user directives;

processing said received directives to produce additional keywords; and prioritizing said keywords and said additional keywords to more narrowly define said querying step.

60. The method of claim 58 and wherein said search criteria data are indicative of the who, what, where, when, or why aspects of said annotation.

61. A method of adding graphical material to a digital graphics album; comprising the steps of:

specifying reference material in a digital graphics album;

extracting annotation data from said reference material;

processing said extracted annotation data by a natural language processor to produce search keywords;

receiving user directive data;

processing said received directive data by a natural language processor to produce additional keywords;

prioritizing said keywords and said additional keywords;

querying a graphical material database through a network connection in accordance with said prioritized keywords;

receiving from said database at least one resultant graphical material;

upon not selecting said at least one resultant graphical material, automatically processing said reference material to produce search criteria that are image content descriptors of said reference material;

querying an image content database through a network connection in accordance with said image content descriptors;

receiving from said image content database at least one resultant image;

selecting at least one of said at least one resultant image; and inserting said selected resultant image in the digital graphics album.

* * * * *